(12) United States Patent
Garcia Ramirez et al.

(10) Patent No.: US 11,691,576 B2
(45) Date of Patent: Jul. 4, 2023

(54) HIGH THERMAL TOLERANCE SHIELD

(71) Applicant: Ford Global Technologies, LLC, Dearborn, MI (US)

(72) Inventors: Arturo Alberto Garcia Ramirez, Venustiano Carranza (MX); Ricardo Daniel Sanchez Lugo, Texcoco (MX); Cindy Barrera-Martinez, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/443,887

(22) Filed: Jul. 28, 2021

(65) Prior Publication Data

US 2023/0041708 A1 Feb. 9, 2023

(51) Int. Cl.
*B60R 13/08* (2006.01)

(52) U.S. Cl.
CPC ................. *B60R 13/0838* (2013.01)

(58) Field of Classification Search
CPC .................................... B60R 13/0838
USPC ........................................ 296/39.3
See application file for complete search history.

(56) References Cited

U.S. PATENT DOCUMENTS

| | | | |
|---|---|---|---|
| 4,137,594 A * | 2/1979 | Arnal | A46B 3/04 15/DIG. 3 |
| 4,584,330 A | 4/1986 | Wason | |
| 10,472,489 B2 | 11/2019 | Mestan | |
| 2004/0127124 A1 * | 7/2004 | Hexels | F41H 3/02 442/131 |
| 2006/0138300 A1 * | 6/2006 | Rubel, Jr. | B60K 5/1233 248/560 |
| 2006/0264566 A1 * | 11/2006 | Cassar | C08L 83/04 524/588 |
| 2018/0187018 A1 | 7/2018 | Schmid et al. | |
| 2021/0262380 A1 | 8/2021 | Garcia Ramirez et al. | |

FOREIGN PATENT DOCUMENTS

| | | | |
|---|---|---|---|
| CN | 204071092 U | | 1/2015 |
| CN | 105482515 A | * | 12/2015 |
| CN | 109369958 A | | 2/2019 |
| JP | 2018051987 A | | 4/2018 |
| WO | 0210265 A1 | | 2/2002 |
| WO | 03076537 A1 | | 9/2003 |

OTHER PUBLICATIONS

Properties of Solids, http://webserver.dmt.upm.es/~isidoro/dat1/eSol.pdf (Year: 2012).*

* cited by examiner

*Primary Examiner* — Yi-Kai Wang
(74) *Attorney, Agent, or Firm* — Vincent Mastrogiacomo; McCoy Russell LLP

(57) ABSTRACT

Methods and systems are provided for a heat shield. In one example, the heat shield is formed of a composite material, the heat shield configured to shield a component from radiated heat. The composite material is a mixture of aluminum particles dispersed in an elastomer matrix.

20 Claims, 3 Drawing Sheets

HIGH THERMAL TOLERANCE SHIELD

FIELD

The present description relates generally to heat shields for vehicle components.

BACKGROUND/SUMMARY

Packaging space in vehicles is becoming increasingly constrained due to a demand for compact vehicles along with advances in vehicle technology which may lead to greater complexity of vehicle components. In vehicle regions prone to high temperatures, such as under-hood and underbody areas, a close proximity of vehicle components may subject components with low heat tolerance to elevated thermal stress. As a result, adaptation of such components to tolerate increased heat exposure is desirable to prolong operation and a useful life of the components.

For example, flexible devices may be used to reduce noise, harshness, and vibrations (NVH) imparted to components a vehicle. As an example, engine mounts may be used to support an engine and dampen transmission of vehicle motion to the engine. The engine mounts may be subjected to high temperatures generated at the engine which may lead to thermal degradation of the mounts. To mitigate this issue, heat shields may be applied to the engine mounts.

The heat shields may be formed of a polymer, such as rubber, to provide deformability while maintaining a weight of the heat shields low. Forming the heat shields from a polymer with a relatively low thermal tolerance may be cost-effective but may result in the heat shield being be prone to fatigue and deformation. However, use of a more heat resistant material such as silicone may be prohibitively costly.

Attempts to address degradation of dampening devices include using devices formed from a composite material. One example approach is shown by Chinese Patent No. CN109369958. Therein, aluminum nitride particles are included in an engine suspension rubber material. The aluminum nitride particles have high thermal conductivity, increasing heat conductivity out of the rubber material thereby suppressing heat accumulation in the rubber material. Inhibiting heat accumulation may reduce thermally-induced macromolecular chain breakage of the rubber polymers and increase resistance of the material to aging and fatigue.

However, the inventors herein have recognized potential issues with such systems. As one example, while increasing the thermal conductivity enhances heat conduction through the rubber material, the rubber polymers are nonetheless subjected to high temperatures. Increasing the thermal conductivity may reduce a residence time of heat within the rubber material but does not circumvent eventual thermal degradation of the rubber component of the composite material.

In one example, the issues described above may be addressed by a heat shield comprising a composite material forming the heat shield, the heat shield configured to shield a component from radiated heat. The composite material is a mixture of aluminum particles dispersed in an elastomer matrix. In this way, the heat shield may effectively reduce heat absorption at the component while maintaining desirable physical properties of the elastomer matrix of the composite material.

As one example, the heat shields may be formed of micron-scale aluminum particles dispersed in the elastomer matrix. The elastomer matrix may be a low cost rubber with higher thermal absorptivity than the aluminum particles. The aluminum particles, having a lower thermal absorptivity, may provide a barrier to heat transmitted to the heat shields via radiation from nearby heat-generating components. Absorption of heat by the elastomer matrix is thus reduced, allowing the heat shields to maintain structural integrity for a prolonged period of time.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-3 are shown approximately to scale.

DETAILED DESCRIPTION

Figure 1:
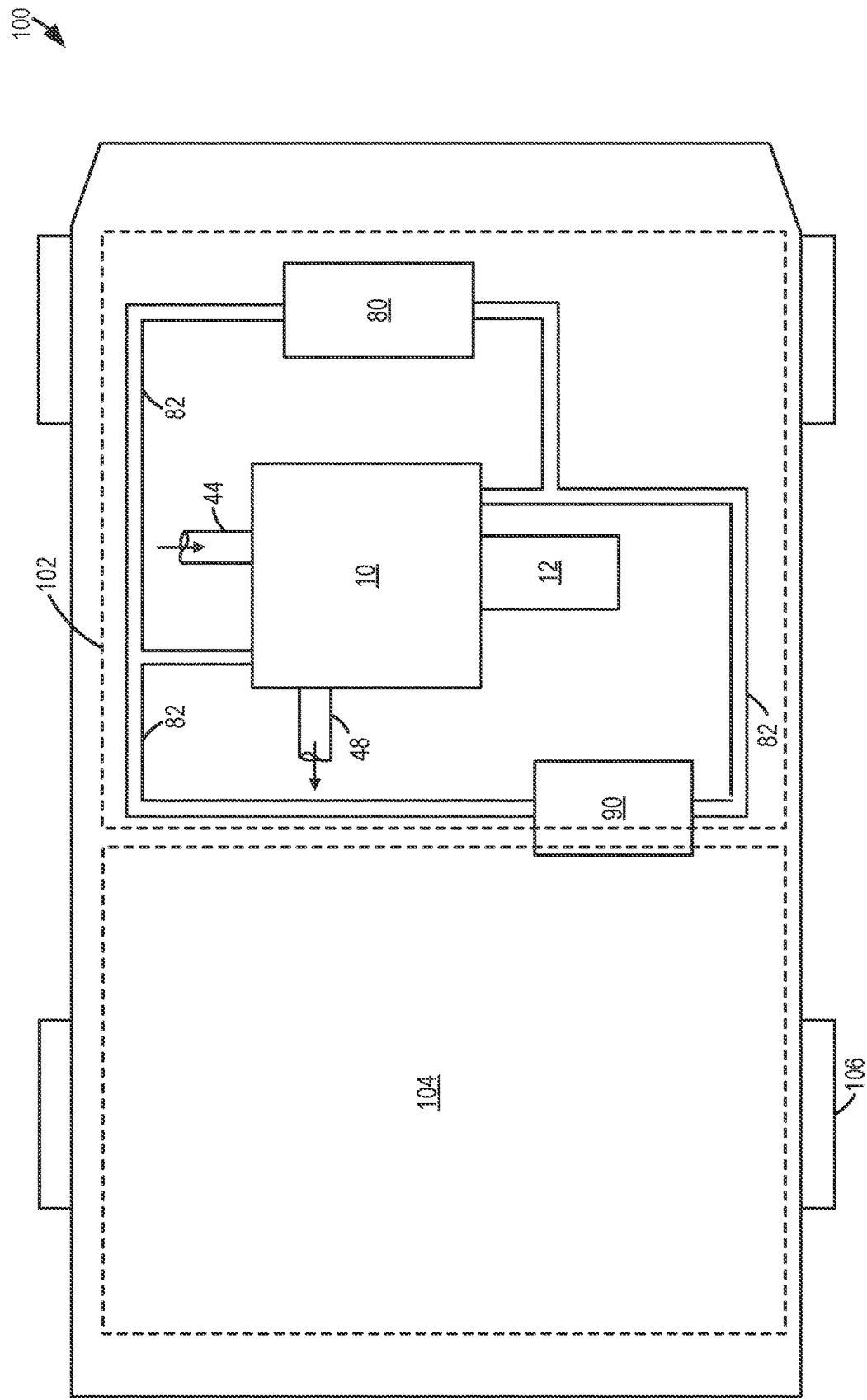
FIG. 1 shows a schematic diagram of vehicle, including an engine and a transmission.
Figure 2:
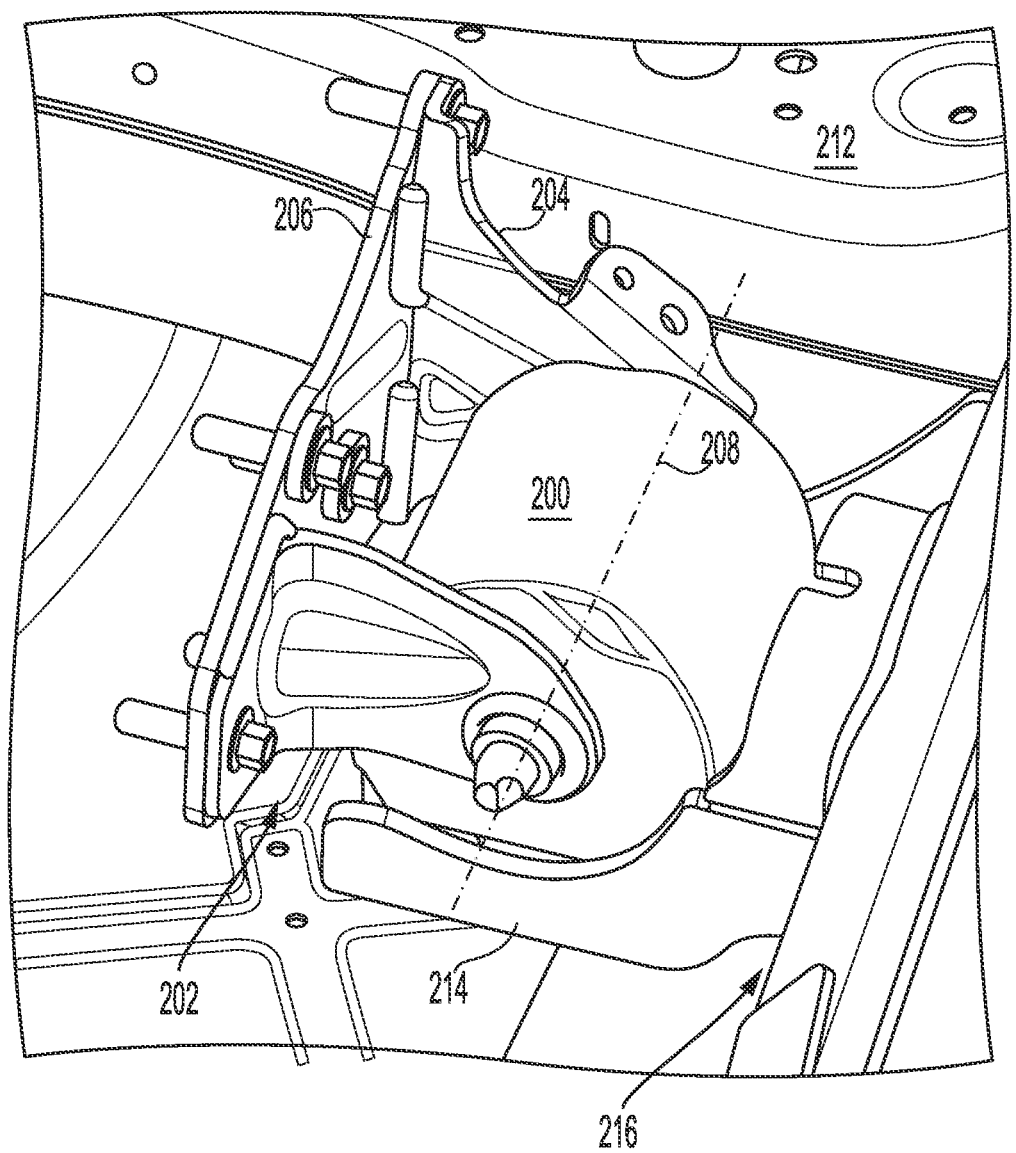
FIG. 2 shows a first example of a heat shield which may be positioned proximate to the engine of FIG. 1.
Figure 3:
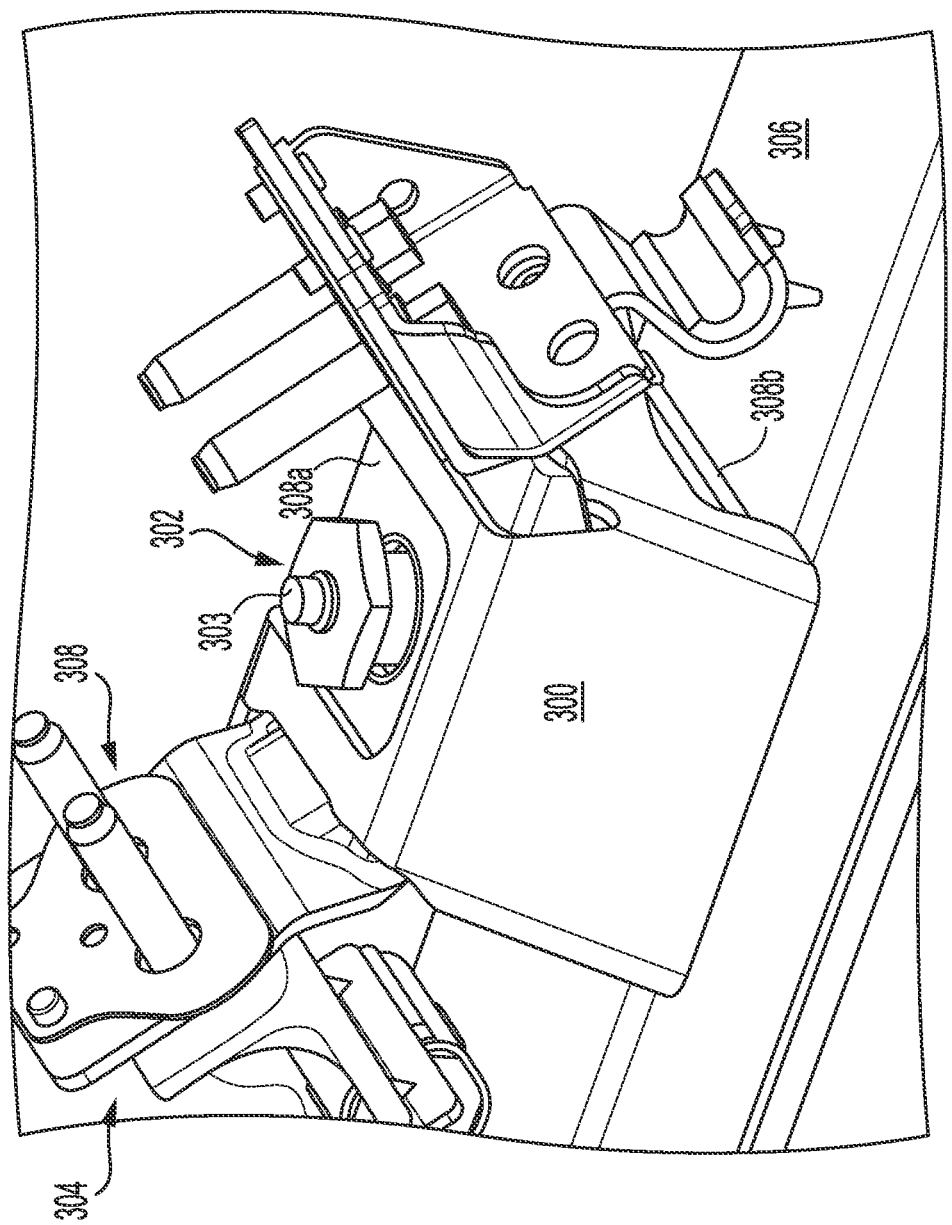
FIG. 3 shows a second example of a flexible support which may be positioned proximate to the transmission of FIG. 1.

The following description relates to systems and methods for heat shields for vehicle components. The heat shields may, for example, be used to shield support devices, such as mounts, from heat generating by nearby high temperature vehicle components. A schematic diagram of an engine system is shown in FIG. 1 which includes components prone to producing heat during vehicle operation. As one example, a heat shield may be applied to an engine mount, as example of which is depicted in FIG. 2. In another example, a heat shield may be used to shield a transmission mount, as shown in FIG. 3. It will be appreciated that the examples shown in FIGS. 2 and 3 are non-limiting examples of heat shields and other examples may include variations in geometry, placement, application, etc.

FIGS. 2-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Composite materials are made from two or more constituents, or parent materials having different physical and/or chemical properties. When the parent materials are combined, a hybrid material is formed which has characteristics that are different from the parent materials. For example, elastomer composites may be a mixture of an elastomer substrate, such as natural rubber, chloroprene, ethylene propylene diene monomer, polysiloxane, etc., and a material with reinforcing qualities, such as higher strength, stiffness, heat resistance, etc. In one example, the reinforcing material may be a metal, such as aluminum or an aluminum alloy. The metal may be dispersed into the elastomer substrate as particles or fibers, for example, such that the metal remains distinct within the elastomer matrix.

Use of composite materials may be driven by a demand for a particular material profile. For example, composite materials may be stronger, lighter, more durable, have a specific thermal property, or reduce a cost relative to the individual parent materials by substituting an amount of a more costly material with a less costly one. As described herein, use of an elastomer or polymer composite to form heat shields for vehicle components may provide suppressed thermal degradation of the heat shields by inhibiting heat absorption at the heat shields. Less heat is transferred from hot vehicle components to the heat shields via radiation, thereby reducing heating of both the heat shields and the vehicle components to high temperatures. Further details of the polymer composite heat shields are provided below, with reference to FIGS. 2 and 3.

Turning now to FIG. 1, a simplified example of a vehicle 100 is illustrated schematically. Vehicle 100 has drive wheels 106, a passenger compartment 104 (herein also referred to as a cabin), and an under-hood region 102 including an internal combustion engine 10. A transmission 12 may be coupled to the internal combustion engine 10, the transmission 12 configured to convert engine torque to the drive wheels 106. Internal combustion engine 10 has one or more combustion chambers which may receive intake air via intake passage 44 and may exhaust combustion gases via exhaust passage 48. Engine 10 as illustrated and described herein may be included in a vehicle such as an internal combustion engine vehicle or a hybrid electric vehicle, among other types of vehicles. While the example applications of engine 10 will be described with reference to a vehicle, it should be appreciated that various types of engines and vehicle propulsion systems may be used, including passenger cars, trucks, etc.

Engine 10 may be fluidically coupled to a radiator 80 and a heater core 90 by coolant lines 82. Heat generated at engine 10 may be absorbed by coolant in the coolant lines 82 and exchanged at the radiator 80 and/or the heater core 90. The under-hood region 102 may include numerous other components, some of which may release or absorb heat, and may demand a compact arrangement of the components within the under-hood region 102. As a result, many of the components may be positioned within close proximity of heat-generating parts, such as engine 10 or transmission 12, including various mounts used to secure positions of various components of the vehicle 100 within the under-hood region 102 or the underbody of the vehicle 100. Furthermore, the mounts may be configured to dampen and/or absorb oscillations to reduce transmission of motion to the secured components during vehicle navigation.

In some examples, the mounts may be directly coupled to heat generating components, such as engine 10, or coupled to a component in close proximity to a heat generating component, such as transmission 12. The mounts may be at least partially formed from a flexible material able to dampen/absorb vibrations and the flexible material may become degraded if subjected repeatedly to high temperatures. To reduce exposure of the mounts to heat, heat shields may be applied to the mounts. The heat shields may be thin shells of a flexible, heat resistant material placed over outer surfaces of the mounts, thereby providing a thermal barrier and prolonging an integrity of the mounts. Further details of the material of the heat shields are provided below.

A first example of a heat shield 200 for a vehicle is depicted in FIG. 2. The heat shield 200 may be used to cover at least a portion of an engine mount 202 which may be used to attach an engine, such as engine 10 of FIG. 1, to a frame or chassis of a vehicle in an under-hood region of the vehicle. The heat shield 200 may be configured as a shell with a shape that matches a geometry of the portion of the engine mount 202 covered by the heat shield 200. The heat shield 200 may be maintained relatively thin, e.g., having a thickness similar to braces 204 or a plate 206 that the engine mount 202 is coupled to, as shown in FIG. 2, thereby minimizing a weight and bulk of the heat shield 200. The portion of the engine mount 202 shielded by the heat shield 200 may be formed of a material that provides dampening capabilities but may be prone to thermal degradation. Thus the heat shield 200 may have a higher thermal tolerance than the portion of the engine mount 202 covered by the heat shield 200.

The engine mount 202 may be a cylindrical structure with a bolt extending through a central axis 208 of the engine mount 202 and may be coupled to a base of an engine 212 via one of the braces 204. Thus the engine mount 202 may not be in direct contact with the engine 212 but may be within a heating radius of the engine and may therefore be heated by the engine 212. By shielding the portion of the engine mount 202 providing dampening capabilities, the heat shield 200 may provide a barrier to heating of the engine mount 202. Furthermore, a material of the heat shield 200 may reduce heating absorption at the heat shield 200 itself.

As shown in FIG. 2, a geometry of the heat shield 200 is also cylindrical, similar to the engine mount 202 and may circumferentially cover the engine mount 202, as well as planar ends of the engine mount 202. The heat shield 200 may have openings corresponding to the bolt extending through the engine mount 202 to accommodate protrusion of the bolt beyond the planar ends of the engine mount 202. The heat shield 200 may further include an opening arranged parallel with the central axis 208 of the engine mount 202 to allow the heat shield 200 to be applied to the engine mount 202, e.g., slid over the engine mount 202 through the opening. As such, the heat shield 200 may only cover a portion of the circumference of the engine mount 202, with a gap to form the opening. The opening may occupy less than half of the circumference of the engine mount 202, such as 10-40%.

The opening of the heat shield 200 may be oriented to align with a portion of the engine mount 202 facing a support 214 that maintains a position of the engine mount 202 relative to a chassis 216 of the vehicle. As a result, a portion of the engine mount that is not covered by the heat shield 200, e.g., at the opening of the heat shield 200, is shielded instead by the support 214. Furthermore, the support 214 is positioned such that the uncovered portion of the engine mount is facing away from the engine 212.

A second example of a heat shield 300 is illustrated in FIG. 3. The heat shield 300 may be used to cover at least a portion of a transmission mount 302, which may be used to secure a position of a transmission, such as transmission 12 of FIG. 1, to a frame or chassis of a vehicle, adjacent to an engine. The heat shield 300 may be configured to cover a central portion of the transmission mount 302, the central portion formed of a deformable material that absorbs oscillations. The deformable material may be prone to thermal degradation which may be reduced by applying the heat shield 300 as shown in FIG. 3. The heat shield 300 may provide a thermal barrier to shield the transmission mount 302 from heat radiated by the transmission, which may be similar to an operating temperature of the engine.

The transmission mount 302 may be position adjacent to a transmission 304 and seated on a chassis 306, secured thereto by a bolt 303. The transmission mount 302 may be coupled to the transmission 304 and to the chassis 306 via a plurality of support structures 308, including various plates, braces, fasteners, etc. The central, deformation portion of the transmission mount 302 may be arranged between a first plate 308a of the plurality of support structures 308 and a second plate 308b of the plurality of support structures 308, with the bolt extending through the transmission mount 302, including through the central portion. The heat shield 300 may extend entirely around the central portion of the transmission mount 302 and may have an opening at a bottom of the heat shield 300, e.g., an end of the heat shield 300 abutting the chassis 306. The opening allows the heat shield 300 to also surround at least two edges of the second plate 308b.

The heat shield 300 further includes a plurality of openings to accommodate extension of the first plate 308a, the bolt 303, etc., therethrough. Thus, the heat shield 300 may be applied to the transmission mount 302 without interfering with a placement of the plurality of support structures 308 and the bolt 303 while providing effective shielding of the transmission mount 302.

It will be appreciated that the examples of heat shield shown in FIGS. 2 and 3 are non-limiting examples. Other examples may include application of the heat shields to various other components where a thermal barrier is desired. Various shapes of the heat shield are possible without departing from the scope of the present disclosure.

Application of a heat shield to vehicle mounts, e.g., engine mounts, transmission mounts, etc., may demand high tolerance of the heat shield to elevated temperatures, such as above 100 degrees C. Effective shielding may be enabled when the heat shield is able to resist absorption of heat, thereby decreasing conduction of heat to the mounts. By forming the heat shield from a material with a high heat tolerance, fatigue and embrittlement of the mount to which the heat shield is coupled, as well as the heat shield itself, may be reduced.

However, conventional materials with a high maximum design temperature (MDT) may impose high costs. For example, a silicone rubber may have a MDT of 225 degrees C. but may be twice as costly as an ethylene propylene diene monomer (EPDM) rubber which may have a lower MDT of 150 degrees C. As vehicle components may reach temperatures between 100-300 degrees C., use of the EPDM rubber for the heat shield may provide insufficient heat tolerance. While forming the heat shield from silicone rubber may increase a robustness of the heat shield, a corresponding increase in costs may decrease a consumer appeal of the vehicle.

To address the issues described above, a composite material may be used to form the heat shield which may include dispersing an additive, which may be incorporated as a filler, into a polymer matrix of the material, the additive having a lower optical and thermal absorptivity than the polymer matrix. In one example, the additive may be particles formed of aluminum (Al) or an Al alloy with diameters less than 100 µm and a density that is higher than a density of the polymer matrix. By using a relatively high density additive, a small volume of the particles may be added, e.g., compared to an additive with a similar density as the polymer matrix, to achieve a desired thermal characteristic of the composite while retaining mechanical properties of the polymer matrix. Furthermore, the polymer matrix may have a thermal absorptivity of 0.7 to 1.0, for example, while the Al particles may have a thermal absorptivity of 0.2 to 0.4. Thus mixing of the Al particles into the polymer matrix may have an overall effect of the decreasing the thermal absorptivity of the resulting composite material relative to the polymer matrix.

Thermal absorptivity is an amount of heat penetrating a material during rapid temperature rise and given as a value between 0 and 1. When the material is in thermal equilibrium with its environment, the thermal absorptivity may be equal to a thermal emissivity of the material. Thus, the absorptivity may be determined by measuring the emissivity. As one example, the emissivity of the material may be determined using a device such as Leslie's cube in conjunction with a thermal radiation detector, such as a thermopile or bolometer. Thermal radiation from the material may be compared to thermal radiation from a nearly ideal, black sample and differences in radiation may be used to estimate the emissivity of the material. The thermal radiation detector may include highly sensitive thermometers that monitor a rise in the detector's temperature when exposed to thermal radiation.

The Al additive (where the Al additive includes both Al and Al alloy particles) may incur a minimal increase in cost compared to using EPDM alone. In one example, the Al additive may be obtained from waste materials, e.g., as a byproduct of industrial processes, and dispersed uniformly, e.g., homogeneously, into the polymer matrix. Incorporation of the Al additive into the polymer matrix suppresses absorption of heat into the resulting composite material, thereby reducing thermal degradation of the composite material. Furthermore, by adjusting an amount of the Al additive in the composite material, physical properties of the composite material may be tuned to achieve a desired performance of the composite material.

For example, for the heat shield, where a capacity to tolerate and support heavy loads is not demanded, the composite material may be configured to provide maximum thermal robustness while maintaining target mechanical properties, such as a tensile strength, an elongation, a tear resistance, a hardness, etc. A useful life of the heat shield may be prolonged without detracting from desired attributes of the polymer matrix.

The Al additive may be used as an additional filler or may at least partially replace a filler of the composite material, depending on properties and a cost of the filler relative to the Al additive. As example, the polymer composite may be an EPDM rubber mixed with various other chemical components as shown in Table 1 below.

TABLE 1

Comparison of composition of control polymer material with composite polymer material

| Ingredient | Control material (phr) | Composite material (phr) |
| --- | --- | --- |
| EPDM | 100 | 100 |
| Paraffinic oil | 70 | 70 |
| Carbon black | 105 | 65-105 |
| Al particles | 0 | 10-50 |
| Coupling agent | 0 | 1-15% (total Al weight) 1-40% (total Al volume) |
| Zinc oxide | 5.0 | 5.0 |
| Stearic acid | 1.5 | 1.5 |
| Tetramethylthiuram disulfide (TMTD) | 1.0 | 1.0 |
| Zinc dibutyldithiocarbamate (Butazate) | 1.8 | 1.8 |
| Naugex ®MBTSW (MBTS) | 3.0 | 3.0 |
| Sulfur | 0.8 | 0.8 |

As shown in Table 1, a composition of a control polymer material (e.g., no Al additive incorporated) is compared with a composition of a composite polymer material with values of chemical ingredients given in parts per hundred rubber (phr). When the Al additive is included in the composition, an amount of carbon black, a filler used to increase an abrasion resistance, modulus, tear/tensile strength of the polymer material, etc., may be adjusted proportionally. For example, as the Al content increases, the carbon black content may decrease. Thus the Al additive may at least partially replace a filler used in a polymer material. Incorporation of the Al additive may also include adding a coupling agent to increase a cohesion between the Al additive and a polymer matrix of the polymer material. An amount of the coupling agent added to the composite polymer material may vary according to a volume or weight content of the Al additive.

As described above, the Al additive may at least partially replace another filler of the composite polymer material. A proportion of the Al additive relative to the filler may be selected based on desired physical properties of the composite polymer material. For example, the Al additive content may be determined based on a balance between abrasion/tear resistance and a thermal absorptivity of the material. For example, when used in heat shields, such as the heat shields illustrated in FIGS. 2 and 3, application of the heat shields may not demand as high of a resistance to abrasion and tearing as, for example, a flexible support coupled to moving parts or supporting a weight of a component. In such instances, e.g., where mechanical performance demands are low, decreased thermal absorptivity of the material may be desired and the proportion of Al additive may be increased.

In other examples, however, application of the heat shields may demand high abrasion and tear resistance as well as reduced thermal absorptivity. The composite polymer material may incorporate a maximum amount of the carbon black, e.g., 100 phr as shown in Table 10, and include the Al additive as an additional filler. For examples, in instances where a high tensile strength and tear resistance is demanded, the carbon black content (or silica, in other examples) may be maximized, e.g., 105 phr, and the Al additive may be added in a suitable quantity. However, in instances where a high hardness of the composite material is desired and low tensile and tear resistance is demanded, partial or even full replacement of the carbon black may be implemented.

As such, physical properties of the composite polymer material may be selectively tuned by adjusting the Al additive content as well as amounts of other fillers. Furthermore, a density of the Al additive may be greater than a density of the polymer matrix of the composite polymer material. A small proportion of the Al additive may enable an effective decrease in the thermal absorptivity of the composite polymer material. By using a small amount of the Al additive as either an additional filler or to at least partially substitute for another filler, less dilution of the polymer matrix is effected, thereby retaining properties of the polymer matrix. For example, in instances where durability and elasticity of the composite polymer material is demanded to support heavy loads and/or tolerate high shear stress, dilution of the polymer matrix may be minimized while decreasing a thermal/optical absorptivity of the material by incorporating the Al additive.

In some examples, such as when a maximum thermal resistance of the heat shields is desired, other fillers may be used in place of carbon black. For example, a composite polymer material may have a base composition shown in Table 2 below.

TABLE 2

Example composition for a composite polymer material configured for high thermal tolerance.

| Ingredient | Amount (phr) |
| --- | --- |
| EPDM | 100 |
| Paraffinic oil | 80 |
| Naphthenic oil | 50 |
| Silica | 110 |
| Clay | 80 |
| Zinc oxide | 5 |
| Stearic acid | 2 |
| Magnesium oxide | 5 |
| Sulfur | 1.5 |
| Rubber accelerator 1 | 1.8 |
| Rubber accelerator 2 | 1 |

In the example composition depicted in Table 2, larger quantities of fillers (e.g., silica and clay) as well as oils (e.g., paraffinic and naphthenic) are included compared to the composition shown in Table 1. The resulting composite polymer material may be used in applications where tolerance for heavy loads/high stress is not demanded, thus a polymer matrix of the material may be diluted with fillers without decreasing a usefulness of the flexible support. By diluting the polymer matrix, less polymer may be used, thereby reducing costs.

Furthermore, the Al additive may be added to the ingredients of Table 2 either as an additional filler or to at least partially replace the silica and/or the clay. As an example, 5-40% by volume of Al particles may be added. The range of the Al additive content (e.g., 5-40%) may be higher than the example composition shown in Table 1 to increase a thermal resistance of the composite material when mechanical performance and volume resistivity demands are low.

The use of Al particles as an additive/filler in a low cost polymer material may form a material with similar physical properties to a more costly material with a higher MDT, such as silicone rubber. For example, a silicone rubber with a durometer measurement of 50, a tensile strength of 6 MPa, and a low temperature resistance (e.g., as measured by a brittleness of the material after soaking for 3 minutes at −55 deg C.), may be desirable for use as heat shields for a vehicle. As an alternative, a composite polymer material with a composition similar to the example composition shown in Table 2 may be used to provide a similar ability to withstand both mechanical wear and heat exposure.

In this way, Al particles may be added to a polymer to form a composite material with high resistance to thermal degradation by reducing a thermal absorptivity of the composite material. By forming heat shields from the composite material, the heat shields may be used to block heat absorption at components covered by the heat shields, such as engine and transmission mounts. An amount of the Al particles incorporated into the composite material, as well as other fillers, may be adjusted according to an application of the heat shields. For example, the Al particles may be added as an additional filler when low mechanical performance of the heat shield is demanded or may at least partially replace another filler when further dilution of a polymer matrix of the composite material is undesirable. The Al particles may be obtained from waste or scrap aluminum to maintain manufacturing costs low. Desirable physical attributes of the heat shields are enhanced or at least maintained while useful lifetimes of the heat shields, and the components shielded by the heat shields, are prolonged.

The disclosure also provides support for a heat shield for a vehicle, comprising: a composite material forming the heat shield, the heat shield configured to shield a component from radiated heat, and wherein the composite material is a mixture of aluminum particles dispersed in an elastomer matrix. In a first example of the system, the component is one of an engine mount or a transmission mount and wherein the heat shield shields the engine mount or the transmission mount from heat radiated from an engine and a transmission, respectively. In a second example of the system, optionally including the first example, the heat shield is configured to cover an outer surface of the component. In a third example of the system, optionally including one or both of the first and second examples, the elastomer matrix has a thermal absorptivity of 0.7 to 1.0. In a fourth example of the system, optionally including one or more or each of the first through third examples, the aluminum particles have a thermal absorptivity of 0.2 to 0.4. In a fifth example of the system, optionally including one or more or each of the first through fourth examples, the aluminum particles are formed of pure aluminum or an aluminum alloy. In a sixth example of the system, optionally including one or more or each of the first through fifth examples, the composite material has a lower thermal absorptivity than the elastomer matrix. In a seventh example of the system, optionally including one or more or each of the first through sixth examples, the aluminum particles have a higher density than the elastomer matrix.

The disclosure also provides support for a heat shield for a vehicle component, comprising: a composite material formed of aluminum particles dispersed in an elastomer, the elastomer having a higher thermal absorptivity than the aluminum particles, wherein the heat shield is coupled to the vehicle component to reduce heating of the vehicle component. In a first example of the system, the composite material includes one or more coupling agents configured to increase a cohesion between the aluminum particles and the elastomer. In a second example of the system, optionally including the first example, the aluminum particles have a diameter of less than 100 microns. In a third example of the system, optionally including one or both of the first and second examples, the aluminum particles are distributed uniformly within the elastomer. In a fourth example of the system, optionally including one or more or each of the first through third examples, the composite material absorbs less heat than the elastomer.

The disclosure also provides support for a vehicle, comprising: an under-hood region, a heat-generating component arranged in the under-hood region and maintained in place by one or more mounts, and a heat shield coupled to each of the one or more mounts, the heat shield formed of an aluminum particle/elastomer composite configured to reduce heat absorption at the one or more mounts. In a first example of the system, the heat shield has a thin, flexible shell with a geometry shaped to match a geometry of the one or more mounts. In a second example of the system, optionally including the first example, the heat shield covers at least a portion of an outer surface of the one or more mounts and wherein the heat shield is positioned between the one or more mounts and a heat-generating device. In a third example of the system, optionally including one or both of the first and second examples, aluminum particles are dispersed in the aluminum particle/elastomer composite as a filler in addition to other fillers of the aluminum particle/elastomer composite. In a fourth example of the system, optionally including one or more or each of the first through third examples, aluminum particles are dispersed in the aluminum particle/elastomer composite to at least partially replace another filler of the aluminum particle/elastomer composite. In a fifth example of the system, optionally including one or more or each of the first through fourth examples, the aluminum particle/elastomer composite has a lower thermal absorptivity than an elastomer matrix of the aluminum particle/elastomer composite. In a sixth example of the system, optionally including one or more or each of the first through fifth examples, the aluminum particle/elastomer composite includes 5-40% by volume of aluminum particles.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A heat shield for a vehicle, comprising:
   a composite material forming the heat shield, the heat shield configured to shield a component from radiated heat, and wherein the composite material is a mixture of aluminum particles dispersed in an ethylene propylene diene monomer (EPDM) matrix in a ratio of 10-50 parts aluminum particles per 100 parts EPDM.

2. The heat shield of claim 1, wherein the component is a transmission mount and wherein the heat shield shields the transmission mount from heat radiated from a transmission.

3. The heat shield of claim 1, wherein the EPDM matrix has a thermal absorptivity of 0.7 to 1.0.

4. The heat shield of claim 1, wherein the aluminum particles have a thermal absorptivity of 0.2 to 0.4.

5. The heat shield of claim 1, wherein the aluminum particles are formed of pure aluminum or an aluminum alloy.

6. The heat shield of claim 1, wherein the composite material has a lower thermal absorptivity than the EPDM matrix.

7. The heat shield of claim 1, wherein the aluminum particles have a higher density than the EPDM matrix.

8. A heat shield for a vehicle component, comprising:
a composite material formed of aluminum particles dispersed in ethylene propylene diene monomer (EPDM) in a ratio of 10-50 parts aluminum particles per 100 parts EPDM, the EPDM having a higher thermal absorptivity than the aluminum particles, wherein the heat shield is coupled to the vehicle component to reduce heating of the vehicle component.

9. The heat shield of claim 8, wherein the composite material includes one or more coupling agents configured to increase a cohesion between the aluminum particles and the EPDM.

10. The heat shield of claim 8, wherein the aluminum particles have a diameter of less than 100 microns.

11. The heat shield of claim 8, wherein the aluminum particles are distributed uniformly within the EPDM.

12. The heat shield of claim 8, wherein the composite material absorbs less heat than the EPDM.

13. A vehicle, comprising:
an under-hood region;
a heat-generating component arranged in the under-hood region and maintained in place by one or more mounts; and
a heat shield coupled to one of the one or more mounts, the heat shield formed of an aluminum particle/ethylene propylene diene monomer (EPDM) composite in a ratio of 10-50 parts aluminum particles per 100 parts EPDM, the composite configured to reduce heat absorption at the one or more mounts.

14. The vehicle of claim 13, wherein the heat shield has a thin, flexible shell with a geometry shaped to match a geometry of the one or more mounts and the geometry including a first planar surface and a second curved or planar surface, where the first surface and the second surface meet to form an intersection, and
the first surface comprising at least one hole and a fastener connecting the respective mount to the vehicle passing through the hole.

15. The vehicle of claim 13, wherein the heat shield covers at least a portion of an outer surface of the one or more mounts and wherein the heat shield is positioned between the one or more mounts and a heat-generating device.

16. The vehicle of claim 13, wherein aluminum particles are dispersed in the aluminum particle/EPDM composite as a filler in addition to other fillers of the aluminum particle/elastomer composite.

17. The vehicle of claim 13, wherein the aluminum particle/EPDM composite has a lower thermal absorptivity than an EPDM matrix of the aluminum particle/EPDM composite.

18. The vehicle of claim 13, wherein the aluminum particle/EPDM composite includes 5-40% by volume of aluminum particles.

19. The heat shield of claim 1, wherein the material comprises a ratio of 65-105 parts carbon black per 100 parts EPDM.

20. The heat shield of claim 1, wherein the material comprises a ratio of at least one of 110 parts silica and 80 parts clay per 100 parts EPDM.

* * * * *